(No Model.)
W. G. WUICHET.
FILTER.
No. 581,324. Patented Apr. 27, 1897.
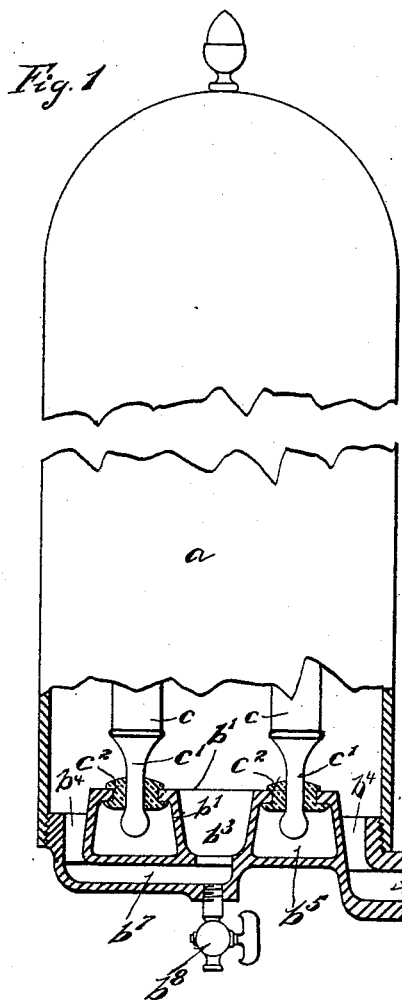
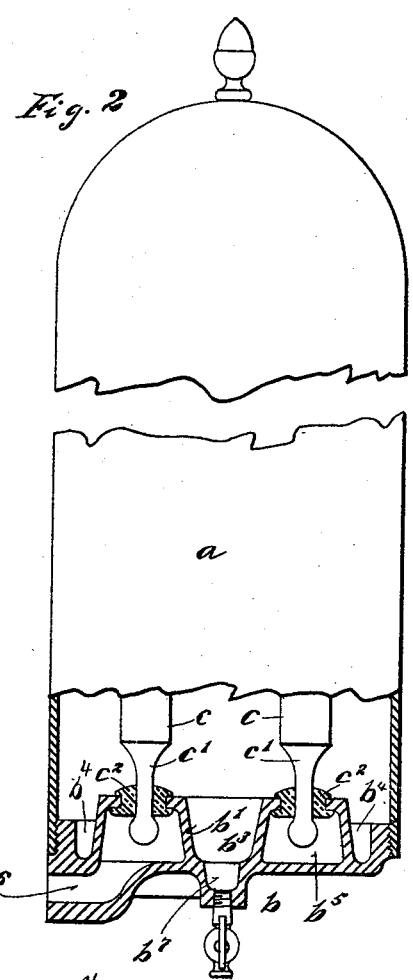
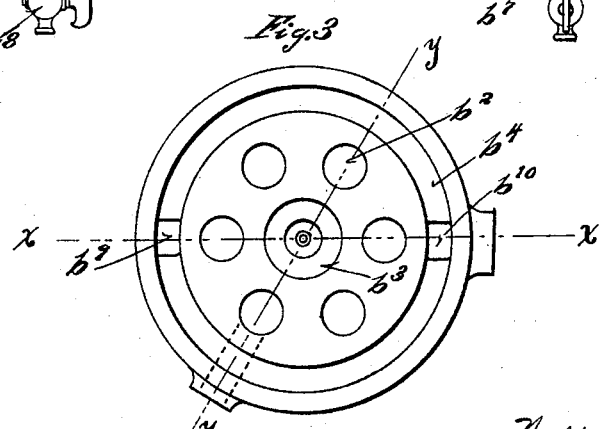
WITNESSES:
H. B. Bradshaw
Fred B. Ernest
INVENTOR
Walter G. Wuichet
BY
Staley & Stephens
ATTORNEYS

UNITED STATES PATENT OFFICE.

WALTER G. WUICHET, OF DAYTON, OHIO, ASSIGNOR TO THE PASTEUR-CHAMBERLAND FILTER COMPANY, OF SAME PLACE.

FILTER.

SPECIFICATION forming part of Letters Patent No. 581,324, dated April 27, 1897.

Application filed March 27, 1894. Serial No. 505,237. (No model.)

*To all whom it may concern:*

Be it known that I, WALTER G. WUICHET, a citizen of the United States, residing at Dayton, in the county of Montgomery and State of Ohio, have invented certain new and useful Improvements in Filters, of which the following is a specification.

My invention relates to improvements in filters, and it especially relates to that class of filters which employ a porous earthenware filtering medium, preferably in the form of tubes, operating under what is known as the "Système Pasteur."

The objects of my invention are to provide a novel construction of the supporting devices for the filtering-tubes which enables the parts to be more readily cleaned and prevents the contamination of the filtered liquid by the unfiltered liquid when the parts are removed for cleaning or otherwise. I attain these objects by the constructions shown in the accompanying drawings, in which—

Figure 1 is a side elevation of a device embodying my invention. Fig. 2 is a similar view of the same with the section taken on a different line. Fig. 3 is a plan view of my improved filter-supporting plate or base to which the parts are adapted to be connected, the lines on which the respective sections in Figs. 1 and 2 are taken being represented by $x\ x$ and $y\ y$ in Fig. 3.

Like parts are represented by similar letters of reference in the several views.

In the said drawings, $a$ represents an outer casing, which is preferably screw-threaded at the bottom and adapted to screw onto the outer periphery of the base or filter-support $b$.

$c$ represents the filtering media, preferably in the form of tubes having nipples $c'$, through which the filtered liquid is adapted to discharge.

It has been common to employ a supporting plate or base for the filtering-tubes, having openings therein for rubber packing or washers through which the tubes are adapted to pass. This plate constitutes a division-wall between the chambers for the filtered and unfiltered liquid. As heretofore constructed, however, this supporting plate or wall has been formed in such a manner that when the devices are removed any unfiltered liquid which remained on the plate or base or in the chamber would percolate through the openings into the chamber containing the filtered liquid. In addition to this the matter in solution in the liquid which is separated by the filter would settle by gravity upon this plate or base, and unless great care was exercised would be washed into the chamber receiving the filtered liquid. To overcome these difficulties, I construct the supporting-base for the filtering-tubes with an elevated support $b'$, in which the openings for the filtering-tubes are placed, and at the sides of the elevated support I form depressed or recessed portions $b^3\ b^4$, from which a discharge-passage extends, so that the unfiltered liquid contained in the chamber $a$ may all be drawn out below the elevated support and the accumulated sediment or suspended matter be washed into said recesses and drawn out therefrom, so that when the tubes are removed the danger of contamination by the entrance of foreign matter or unfiltered liquid into the receiving-chamber is prevented. This elevated support is preferably formed in the nature of a hollow ring which contains a chamber $b^5$, into which the filtered liquid is discharged. This chamber $b^5$ is provided with a suitable discharge-passage $b^6$, which may be connected to any suitable receiving-reservoir or provided with a cock in the usual way to draw off the filtered liquid. Arranged centrally within this elevated supporting-ring is the receiving recess or pocket $b^3$, the bottom of which opens into a passage $b^7$, provided with a suitable cock $b^8$, through which said pocket may be discharged. The depression $b^4$ is also formed concentric with the supporting-ring and extends around the same and communicates through a suitable opening $b^9$ with the passage $b^7$. It is further connected to a passage $b^{10}$, which preferably opens in the bottom thereof, through which the liquid to be filtered is supplied to the chamber $a$.

In operation, the filtering-tubes being mounted in the supporting-ring through the agency of rubber washers or other suitable connecting devices $c^2$, the cock $b^8$ is closed and the unfiltered liquid admitted through the passage $b^{10}$ and, rising into the chamber $a$, envelops the filtering-tubes. Passing through the walls of the tubes in a well-known manner it is discharged into the chamber $b^5$ and from thence through the passage $b^6$.

It will be understood that a filter of this character is especially adapted to be operated under pressure by connection to ordinary water-mains or in any suitable manner. The entrance of the water into the chamber $a$ under pressure, passing, as it does, from the bottom upwardly, tends to dislodge a certain amount of the foreign matter on the filtering-tubes and thus partially clean the same. The material thus dislodged settles to the bottom, and by closing off the water-supply and opening the cock $b^8$ the sediment thus dislodged, being contained within the annular pockets or depressions $b^3 b^4$, will be drawn out through the discharge-opening.

The washers which hold the tubes will form a dam or obstruction around the openings to prevent dirt or unfiltered liquid from falling through said openings when the tubes are removed.

When it is desired to remove the filtering media for cleaning or otherwise, the casing $a$ is removed. The elevated support $b'$ may be thoroughly cleaned and all the unfiltered liquid or foreign substance therein washed into the receiving-pockets $b^3 b^4$, after which the tubes may be readily removed without danger of contaminating substances entering the chamber $b^5$, which contains the filtered liquid.

The construction also permits the ready removal of the parts without disconnecting the filter from the water-supply or from the reservoir, if such be employed, the construction permitting the connection of the filter from any convenient point by suitable pipe connections, the supply thereto and discharge therefrom being piped to or from any suitable distance.

Having thus described my invention, I claim—

1. In a filter, a supporting-base having an elevated tube-support with an annular chamber, filtering-tubes removably connected to said tube-support so as to discharge into said chamber, a central pocket or depression arranged within said tube-support, and an annular recess or pocket extending around said tube-support, a discharge-passage connecting said central pocket and said annular recess, a discharge-opening leading from said passage, and supply and discharge openings for the filtered and unfiltered liquid also formed in said base and connected to opposite sides of the tube-support, substantially as specified.

2. In a filter, a supporting-base having an elevated tube-support having a central pocket or depression, and an annular recess surrounding the same, an annular chamber in said support, and filtering-tubes removably connected in said support so as to discharge in said chamber, a discharge-passage connecting the central pocket and the annular recess, and a discharge-opening from said passage, substantially as specified.

3. In a filter, a supporting-base having removably secured thereto an outer casing surrounding an elevated and perforated tube-support, an annular recess or pocket surrounding said tube-support, and a chamber under said tube-support, one or more filtering-tubes fitted into flexible washers in said perforations so as to discharge through said tube-support into said chamber, a supply-opening through said base connected to said annular depression, and a discharge-opening through said base from said chamber, substantially as specified.

4. In a filter, a supporting-base, and an outer removable case or covering detachably connected thereto, said base having an annular pocket or depression within said case and surrounding an elevated perforated tube-support, one or more filtering-tubes connected in said tube-support, and a chamber in said base and below said tube-support in which said filtering-tubes discharge, a supply-passage formed in said base and below said case and opening into said annular pocket or depression, and a discharge-opening also formed in said base and connected with the chamber under said tube-support, substantially as specified.

In testimony whereof I have hereunto set my hand this 17th day of March, A. D. 1894.

WALTER G. WUICHET.

Witnesses:
OSCAR J. BARD,
JOHN A. MILLER.